US012152396B2

(12) United States Patent
You et al.

(10) Patent No.: US 12,152,396 B2
(45) Date of Patent: Nov. 26, 2024

(54) METHODS, DEVICES AND SYSTEMS FOR INSULATING CAVITIES OF BUILDINGS WITH FOAM INSULATION

(71) Applicant: CertainTeed LLC, Malvern, PA (US)

(72) Inventors: Sizhu You, Auburndale, MA (US); Dennis Michaud, Groton, CT (US); Jerome Arul, Providence, RI (US); Timothy Briggs, Clinton, MA (US); Kyle Pina, Newton, MA (US); Jonathan Wilson, Northboro, MA (US)

(73) Assignee: CertainTeed LLC, Malvern, PA (US)

(*) Notice: Subject to any disclaimer, the term of this patent is extended or adjusted under 35 U.S.C. 154(b) by 0 days.

(21) Appl. No.: 16/678,334

(22) Filed: Nov. 8, 2019

(65) Prior Publication Data
US 2020/0149297 A1 May 14, 2020

Related U.S. Application Data

(60) Provisional application No. 62/758,419, filed on Nov. 9, 2018.

(51) Int. Cl.
E04F 21/08 (2006.01)
B29C 44/18 (2006.01)
(Continued)

(52) U.S. Cl.
CPC ............ *E04F 21/085* (2013.01); *B29C 44/18* (2013.01); *B29C 44/386* (2013.01); *E04B 1/7604* (2013.01); *E04D 13/1668* (2013.01)

(58) Field of Classification Search
CPC .. E04F 21/085; E04L 31/7604; B29C 44/386; B29C 44/18; B29L 2031/776; B29K 2075/00; B29K 2995/0015
See application file for complete search history.

(56) References Cited

U.S. PATENT DOCUMENTS 2,972,362 A * 2/1961 Gardner .............. G01F 23/0015
141/96
3,229,441 A 1/1966 Heffner
(Continued)

FOREIGN PATENT DOCUMENTS

EP 1186320 A2 3/2002
JP 62041844 A 2/1987
(Continued)

OTHER PUBLICATIONS

Copending U.S. Appl. No. 16/221,156, filed Dec. 12, 2018.
Copending U.S. Appl. No. 15/251,783, filed Aug. 30, 2016.

*Primary Examiner* — Brand D Mattei
*Assistant Examiner* — Omar F Hijaz
(74) *Attorney, Agent, or Firm* — McDonnell Boehnen Hulbert & Berghoff LLP

(57) ABSTRACT

The present disclosure relates generally to methods, devices and systems for insulation, e.g., of cavities associated with walls, ceilings, floors and other building structures, with foam insulation. In one aspect, the disclosure provides a method for providing a cavity of a building with a predetermined amount of foam insulation. The method includes actuating a valve to begin dispensing foam insulation into the cavity, the actuation being performed by a user, the actuation by the user fixing a start time and/or a zero volume of a time and/or volume meter; then, dispensing the foam insulation from the insulation dispenser into the cavity as the time and/or volume meter counts time and/or volume dispensed; then when a predetermined time after the start time elapses or a predetermined volume of the foam insulation beyond the zero volume is dispensed as measured by the time and/or volume meter, actuating the valve to stop dispensing the foam insulation into the cavity.

20 Claims, 9 Drawing Sheets

(51) Int. Cl.
*B29C 44/38* (2006.01)
*E04B 1/76* (2006.01)
*E04D 13/16* (2006.01)

(56) References Cited

U.S. PATENT DOCUMENTS

| | | | |
|---|---|---|---|
| 3,242,240 A | | 3/1966 | Tantlinger |
| 3,945,533 A | * | 3/1976 | Otto .................... B05B 9/01 |
| | | | 222/639 |
| 4,103,646 A | | 8/1978 | Yerushalmi et al. |
| 4,225,057 A | * | 9/1980 | Horn .................... B67D 1/1243 |
| | | | 222/27 |
| 4,272,935 A | | 6/1981 | Lukas et al. |
| 4,337,318 A | | 6/1982 | Doyle |
| 4,342,181 A | | 8/1982 | Truesdell |
| 4,644,014 A | * | 2/1987 | Thomson ............. B29B 7/7438 |
| | | | 521/68 |
| 4,731,389 A | | 3/1988 | Christopher et al. |
| 4,913,317 A | * | 4/1990 | Wernicke ............. B29B 7/7409 |
| | | | 222/1 |
| 5,000,893 A | | 3/1991 | West et al. |
| 5,207,047 A | | 5/1993 | Prignitz |
| 5,427,137 A | * | 6/1995 | Bowen .................. B67D 7/365 |
| | | | 116/204 |
| 5,740,074 A | | 4/1998 | Wang et al. |
| 6,117,256 A | | 9/2000 | Hunter |
| 6,662,516 B2 | | 12/2003 | Vandehey et al. |
| 7,396,512 B2 | * | 7/2008 | DiTrolio ................ B01L 3/021 |
| | | | 422/522 |
| 7,462,001 B2 | | 12/2008 | Canteri |
| 8,163,995 B2 | | 4/2012 | Donaldson |
| 8,495,852 B2 | | 7/2013 | Fay |
| 8,680,168 B2 | | 3/2014 | Fishback et al. |
| 8,950,142 B2 | | 10/2015 | Fay |
| 9,309,663 B2 | | 4/2016 | Fay |
| 2002/0108347 A1 | * | 8/2002 | Vandehey ............ E04B 1/7604 |
| | | | 52/742.13 |
| 2011/0221085 A1 | | 9/2011 | Fiorentini et al. |
| 2013/0086868 A1 | | 4/2013 | Vandehey |
| 2017/0080614 A1 | * | 3/2017 | Lamm ................... E04B 1/7604 |
| 2019/0118430 A1 | | 4/2019 | Lamm |

FOREIGN PATENT DOCUMENTS

| | | | | |
|---|---|---|---|---|
| JP | 3207344 U | * | 11/2016 | |
| WO | WO-9426607 A1 | * | 11/1994 | ............. G01F 11/22 |
| WO | WO-2005090037 A1 | * | 9/2005 | ........... B29B 7/7438 |

\* cited by examiner

METHODS, DEVICES AND SYSTEMS FOR INSULATING CAVITIES OF BUILDINGS WITH FOAM INSULATION

CROSS-REFERENCE TO RELATED APPLICATIONS

This application claims the benefit of priority of U.S. Provisional Patent Application No. 62/758,419, filed Nov. 9, 2018, which is hereby incorporated herein by reference in its entirety.

BACKGROUND OF THE DISCLOSURE

1. Field of the Disclosure

The present disclosure relates generally to methods, devices and systems for insulation, e.g., of cavities associated with walls, ceilings, floors and other building structures. More particularly, the present disclosure relates to methods, devices and systems for insulation with foam insulation, such as expanding foam insulation.

2. Technical Background

Heating and cooling of buildings uses approximately 35% of all the energy consumed in the United States of America (USA). Thanks to numerous innovations in construction practices and materials used in new construction, new buildings use less than half the energy per square foot of older buildings. However, the number of new buildings built each year is only about 2% of the number of existing buildings. Since most buildings last for 50 years or more, it will take several generations before low energy new buildings begin to have a significant impact on the overall energy used by buildings in the USA. Thus there is an urgent national need for simple, low-cost retrofit energy saving technologies that can be applied to existing buildings to achieve energy use similar to new buildings.

The most common approach to reduce thermal energy use in existing buildings is "weatherization." In a typical weatherization job, a contractor seals air leaks and adds additional blown-in fibrous insulation to the attic of a building. Federal and state governments have invested billions of dollars in weatherization programs. However, most studies indicate that weatherization projects result in average energy savings of only 15% and don't come close to achieving the energy use levels of new buildings. A recent study of weatherization programs, conducted by MIT, the University of Chicago, and the University of California, concluded that the average annual return on government funded weatherization programs is −9%.

Another approach for reducing thermal energy use in buildings is a "deep energy retrofit." As opposed to the 15% energy savings of a weatherization job, a deep energy retrofit of a building can reduce the thermal energy use by 30%-50% or more. Typical deep energy retrofits involve tearing off siding, resetting windows, reconfiguring roof eaves, fitting foam boards to the exteriors of the building, and replacing the siding. Because of the invasiveness of this process, the cost and time involved is very high. Typical time to complete a deep energy retrofit of a house is several months and often requires building occupants to vacate the building. Typical payback time is 25 years or more. Conventional deep energy retrofits are clearly not economically viable on a large scale.

Typical insulating materials used in building insulations include solid rigid foam insulating boards, fibrous insulation, and spray or injection foams. Rigid foam insulating boards are composed of small, individual cells separated from each other. The cellular material may be glass or foamed plastic, such as polystyrene, polyurethane, polyisocyanurate, polyolefin, and various elastomeric materials. Fibrous insulation is composed of small-diameter fibers, which finely divide the air space. Examples of fibrous insulation include fiberglass and mineral wool type insulations. Foam-in place insulation includes liquid foams that are sprayed, injected, or poured in place. In one example of spray or injection polyurethane foams, a two-component mixture composed of isocyanate and polyol resin is mixed near the tip of a gun. The two most common methods of mixing are impingement mixing (a "high pressure" system), in which two streams of material impact each other under high pressure and static mixing (a "low pressure" system), in which the two streams of material are interlaced using a series of mixing elements. After ejection from the gun, the mixed partially expanded material forms an expanding foam that is sprayed onto roof tiles, concrete slabs, into wall cavities, or through holes drilled into a cavity of a finished wall. Once in place, the mixed foam fully expands. In closed-cell foam, the high-density cells are closed and filled with a gas that both enhances insulation value and helps the foam expand to fill the spaces around it. Open-cell foam cells are not as dense as the closed-cell foams and are filled with air, which gives the insulation a spongy texture.

Injection of open or closed cell foam into cavities within a building can achieve many of the same benefits of a traditional deep energy retrofit at costs that are at least an order of magnitude lower—and in a timeframe of days rather than months. Closed cell foam in particular offers many advantages over traditional fiberglass or cellulose insulation since it has twice the insulation value per inch and serves as both an air barrier and vapor barrier. Energy models of a house injected with closed cell foam indicate that thermal energy savings of 30%-50% can be achieved. A typical house can be injected in 3 days and the modeled payback time is only 5 years or less.

In a typical liquid foam injection process, holes (e.g., 4 or more) are drilled on the interior or exterior of each cavity within the building, and then a 6" long tube is inserted into these holes and a shot of foam is injected and falls to the bottom of the cavity. The cavities are typically about 3.5 or about 5.5 inches in depth (i.e., respectively for 2×4 and 2×6 constructions), and can have an effective void depth of much less when other insulation is already disposed in the cavity. After the foam has fully expanded and is tack free, a second shot can be injected above the first shot. Each layer of foam is called a "lift". A typical 14.5" wide×8' high cavity is filled with 3 to 4 lifts of foam. As the foam cures within the cavity, it heats up in an exothermic reaction. Heated foam can be easily visualized from the outside of the cavity with an infrared camera, and voids within the foam can be identified and corrected with additional shots of foam.

Despite its tremendous potential, injection foam is rarely practiced. One of the main issues is concern about the expanding foam "blowing out" walls. Typical closed cell injection foam, known as "pour foam", expands 30 times its liquid volume. This significant expansion combined with a compressive strength of 25 psi or more can easily cause existing plaster or drywall to bow out or completely detach from the framing.

Some insulation workers have tried to address this issue by using foams that only expand 3 to 5 times their dispensed volume. These foams, known as "froth foams", contain gaseous blowing agent or a mixture of gaseous and liquid blowing agents. While froth foams are generally preferred over pour foams, the packaging, metering and mixing of froth foams is problematic. Due to the gaseous blowing agent, froth foams are packaged in pressure vessels. Foams in disposable pressure vessels are expensive to package and ship—costing about twice as much as two component pour foams—and have inadequate control over dispensed volume and mixing. Re-usable pressure vessels are heavy, can't easily be moved around inside a building, and are exceedingly difficult for manufacturers to track. Metering of non-froth foams can be equally, or even more challenging.

An additional method of addressing the blow out issue is to drill multiple pressure relief holes, often of 1" diameter or more. Any excess foam flows out of these pressure relief holes to avoid pressure buildup on the walls of the cavity. However, such large holes require extensive repair and repainting of the interior or exterior of the wall cavity.

What is needed are improved methods, devices and systems for insulating building cavities with foam insulation.

SUMMARY OF THE DISCLOSURE

In one aspect, the present disclosure provides a method for providing a cavity of a building with a predetermined amount of foam insulation (e.g., expanding foam insulation), the cavity having a first wall, the method comprising
  actuating a valve (e.g., of an insulation dispenser) to begin dispensing foam insulation (e.g., from the insulation dispenser) into the cavity, the actuation being performed by a user, the actuation by the user fixing a start time and/or a zero volume of a time and/or volume meter; then,
  dispensing the foam insulation (e.g., from the insulation dispenser) into the cavity as the time and/or volume meter counts time and/or volume dispensed; then
  when a predetermined time after the start time elapses or a predetermined volume of the foam insulation beyond the zero volume is dispensed as measured by the time and/or volume meter, actuating the valve to stop dispensing the foam insulation into the cavity.

In another aspect, the present disclosure provides an insulation dispenser comprising:
  a body having one or more input ports and an output port
  one or more valves, each configured to control fluid communication between one or more of the input ports and the output port such that fluid communication being allowed when the valve(s) are open and fluid communication not being allowed when the valve(s) are closed;
  a user-actuatable actuator configured to actuate the one or more valves;
  wherein the insulation dispenser is configured to fix a start time and/or a zero volume of a time and/or volume meter upon actuation of the actuator by a user.

In another aspect, the present disclosure provides an insulation dispenser comprising:
  a body having one or more input ports and an output port;
  one or more valves, each configured to control fluid communication between one or more of the input ports and the output port such that fluid communication is allowed when the valve(s) are open and fluid communication not being allowed when the valve(s) are closed;
  a time and/or volume meter, the time and/or volume meter being configured to meter a dispense time or an amount of dispensed material;
  a Hall Effect sensor operatively connected to the time and/or volume meter; and
  a user-actuatable actuator configured to move one or more magnets and to actuate the one or more valves, such that actuation of the one or more magnets causes the one or more Hall Effect sensors to communicate actuation of the valve to the time and/or volume meter, the user-actuatable actuator not otherwise being operatively coupled to the time and/or volume meter.

Additional aspects of the disclosure will be evident from the disclosure herein.

BRIEF DESCRIPTION OF THE DRAWINGS

The accompanying drawings are included to provide a further understanding of the methods and devices of the disclosure, and are incorporated in and constitute a part of this specification. The drawings are not necessarily to scale, and sizes of various elements may be distorted for clarity. The drawings illustrate one or more embodiment(s) of the disclosure, and together with the description serve to explain the principles and operation of the disclosure.

DETAILED DESCRIPTION

The present inventors have noted that while processes for injecting foam insulation into enclosed building cavities have previously existed, they were disadvantaged by the risks of under- or over-filling the cavity, as there have not conventionally been ways to properly meter the amount of foam insulation entering the cavity. The present disclosure provides a number of ways to control the amount of foam insulation being dispensed into a cavity, e.g., based on time and/or volume metering. In some embodiments, such metering can be performed through directing a user to when to stop dispensing foam through an insulation dispenser. In other embodiments, direct control of the amount of foam insulation is performed (e.g., through electronic control of one or more valves).

Foam insulation materials, such as expanding foam insulation materials, are known in the art. Such materials are typically based on polyurethanes, formed from mixing an "A" component (typically isocyanate-based) and a "B" component (typically polyol-based). A blowing agent (gas, or a material that will evolve gas) is used to foam and expand the A+B reaction product. As used herein, an "expanding" foam is one that expands to at least 150% of its as-dispensed volume after it is dispensed in a cavity. In certain embodiments, the expanding material used in conjunction with the methods, devices and systems described herein expand to at least three times, or at least ten times, or even at least twenty times its as-dispensed volume after it is dispensed in a cavity. Reference herein to a material as "expanded" relates to the material after it is in its final, expanded state.

The expanding foam insulation is typically in a partially-expanded state as it is dispensed into the building cavity, where it continues to expand to its final expanded state. However, the person of ordinary skill in the art will appreciate that the expanding foam insulation can be dispensed in a variety of forms. The expanding foam insulation may not yet be substantially expanded, such that it is substantially expanded only in the cavity. For example, precursors can mix in the dispenser to react and begin to expand, so that a partially-expanded foam is what is dispensed into the cavity. Material described herein as "expanding insulation foam" encompasses any set of one or more precursors and/or reaction products thereof that are admitted together to the cavity and form the expanded foam insulation. And in certain embodiments, the foam need not be an "expanding" foam; other dispensable foam insulation products (e.g., foam beads with or without binders, frothed foams such as mechanically frothed foam and air frothed foam) can benefit from the methods and systems described herein.

Figure 1:
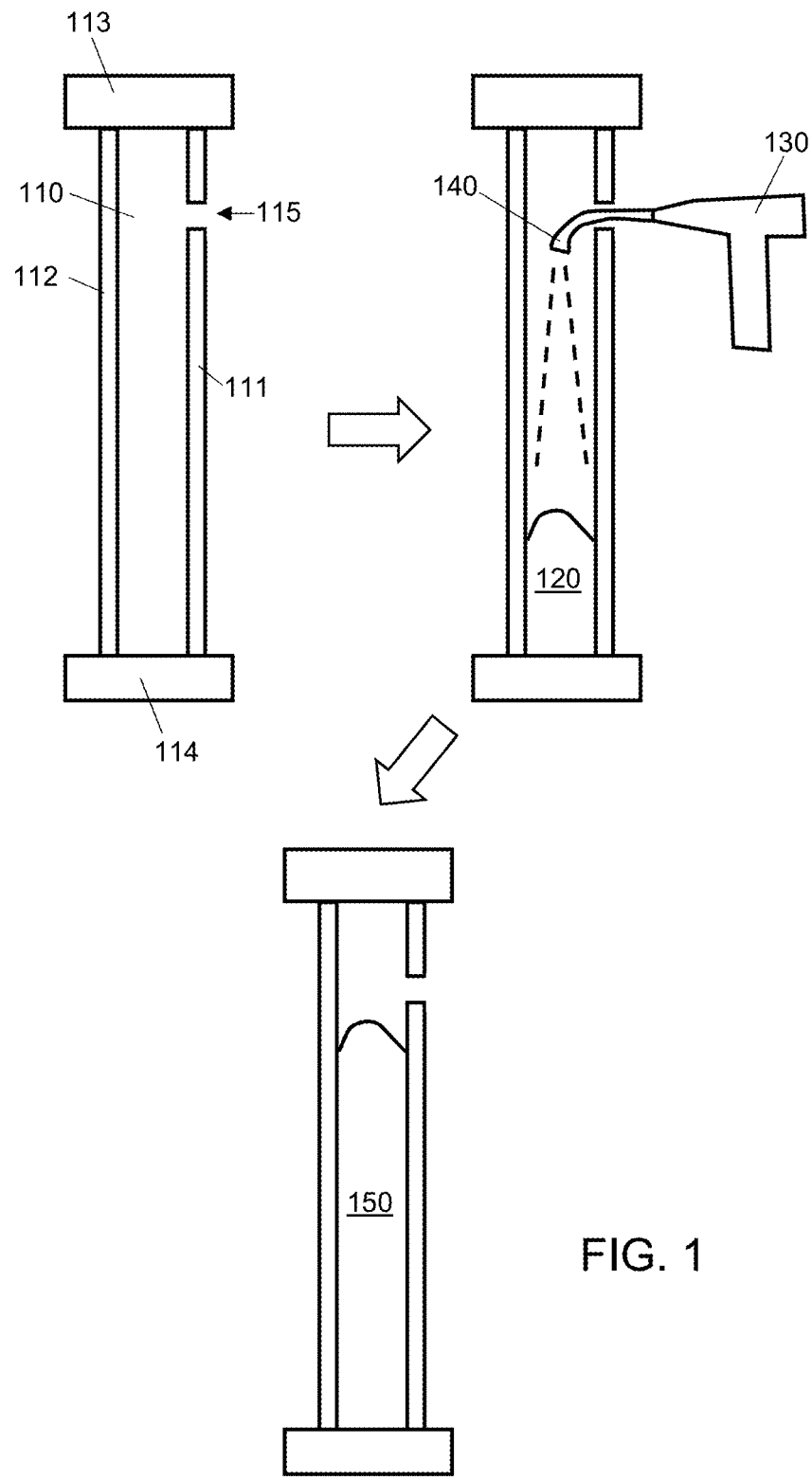
FIG. 1 is a schematic cross-sectional view of the dispensing of foam insulation into a cavity at least partially enclosed by one or more walls according to one embodiment of the disclosure.

FIG. 1 is a schematic cross-sectional view of the dispensing of foam insulation into a cavity at least partially enclosed by one or more walls. Wall cavity 110 includes a first wall 111, a second wall 112, a third wall 113 and a fourth wall 114, defining a substantially enclosed cavity. Wall cavity 110 can be closed off by two additional walls, e.g., parallel to the plane of the page. As is conventional, these walls can be formed of a variety of materials, e.g., wallboard, lath and plaster, cement, wood, metal, and different materials can be used in different walls of a particular cavity. One or more of the walls enclosing the cavity can be formed from framing members; in the example of FIG. 1, the first and second walls are wallboards and the third and fourth walls are framing members. And the person of ordinary skill in the art can appreciate that different cavities may have different shapes and thus different numbers of walls enclosing them. As used herein, a "substantially enclosed" cavity is enclosed over at least 90%, e.g., at least 95% of its surface area. The cavity can be, for example, a wall cavity, a ceiling cavity, or a floor cavity. The cavity thus need not be entirely enclosed. The person of ordinary skill in the art will appreciate that the methods described herein can be used in the insulation of a wide variety of building cavities. Such cavities can, in some cases, already have fibrous insulation (e.g., fiberglass) disposed therein. Insulating foam insulation 120 (e.g., in a mixed and partially-expanded stated) is dispensed through an aperture 115 in the first wall 111 into the cavity 110 from an insulation dispenser 130 (often in the form of a "gun"), either directly from the tip of the dispenser or through a tube 140 extending into the cavity. After a volume of partially-expanded foam 120 is dispensed, it continues to expand to provide fully-expanded foam insulation 150 disposed in the cavity. Often, multiple "shots" of foam insulation are used to fill the cavity. After the desired amount of material is dispensed and expanded, the aperture can be patched if desired. A number of methods for dispensing foam insulation into building cavities are described in U.S. Patent Application Publication no. 2017/0080614, which is hereby incorporated herein by reference in its entirety. The person of ordinary skill in the art can adapt any of the methods described therein, as well as other methods for dispensing insulating foam, with the metering methods, devices and systems described here.

In one aspect, the disclosure provides a method for providing a cavity (e.g., as described above with respect to FIG. 1) of a building with a predetermined amount of expanded foam insulation. The method includes actuating a valve of an insulation dispenser to begin dispensing foam insulation from the insulation dispenser into the cavity. The actuation of the valve is performed by a user, i.e., the person dispensing the foam insulation into the cavity. Notably, the actuation of the valve by the user fixes a start time of a time meter, and/or a zero volume of a volume meter (i.e., depending on whether time metering or volume metering is used, as described in more detail below.) The foam insulation is then dispensed from the insulation dispenser into the cavity, as the time meter counts time and/or the volume meter counts volume. Then, when a predetermined time after the start time elapses as measured by the time meter, or a predetermined volume of the foam insulation beyond the zero volume is dispensed as measured by the volume meter, the valve is actuated to stop dispensing the foam insulation. If the foam insulation is an expanding foam insulation, it can then be allowed to finish expanding, thereby forming the expanded foam insulation in the cavity.

In certain embodiments, the cavity has a first wall having an aperture formed therein, and the foam insulation is dispensed into the cavity from the insulation dispenser through the aperture. In many common installations, and especially in retrofit installations, it is impractical to access the wall cavity without forming an aperture in a wall thereof. Accordingly, in many embodiments, a method as otherwise described herein includes forming the aperture in the first wall before actuating the valve to begin dispensing. In certain embodiments, the aperture can be patched after dispensing the foam insulation.

Figure 2:
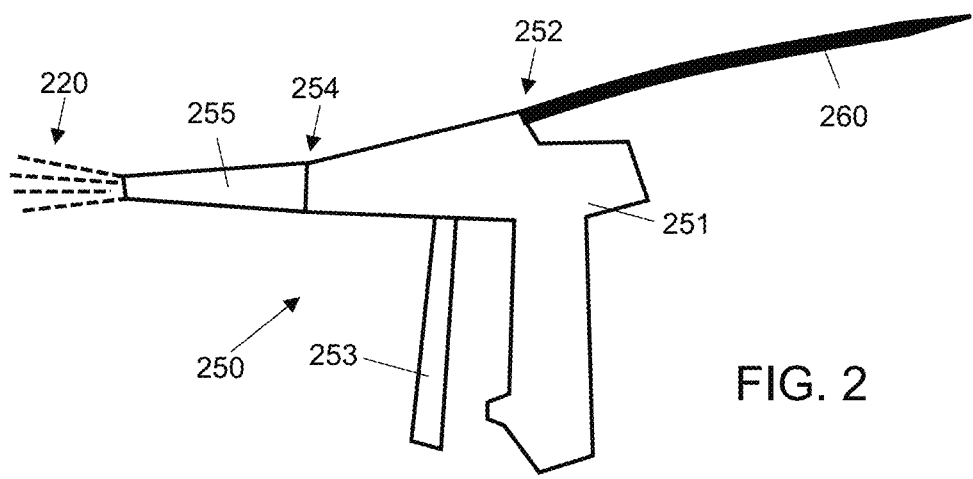
FIG. 2 is a schematic view of an insulation dispenser in the form of an insulation dispenser gun according to one embodiment of the disclosure.

As described above, the user actuates the valve of the insulation dispenser to begin dispensing the foam insulation. Accordingly, the user can position the insulation dispenser properly with respect to the cavity before beginning the flow of the foam insulation. The manner in which the user actuates the valve of the insulation dispenser will depend strongly on the design of the insulation dispenser. One example of an insulation dispenser is shown in schematic view in FIG. 2. Insulation dispenser 250 takes the form of a dispensing "gun." It includes a body 251, which has one or more hoses 260 coupled to the body at one or more input ports 252 thereof to convey a supply of one or more precursors of the foam insulation. There are often two hoses and two input ports present, one for the "A" component and the other for the "B" component, with the mixing of the reactive mixture happening in the body. The body includes one or more valves (e.g. needle valves, not shown) configured to be opened when the trigger 253 is pulled against the body. While the device of FIG. 2 uses a trigger as the user-actuatable actuator, the person of ordinary skill in the art will appreciate that a variety of other types of actuators can be used, e.g., a button or a switch. The one or more valves control fluid communication between the one or more input ports 252 and output port 254, to which nozzle 255 is coupled, with fluid communication being allowed when the valve(s) are open and fluid communication not being allowed when the valve(s) are closed. Accordingly, when the one or more valves are actuated to begin dispensing by pulling the trigger, the one or more precursors can pass through the body from the one or more hoses 260 to the nozzle 255, from which the foam insulation 220 can be dispensed. The body can also include a mixing chamber (not shown) in which precursors of the foam insulation can mix before being conducted to the output port. As the person of ordinary skill in the art will appreciate, various aspects of conventional insulation dispensers can be included in the insulation dispensers described herein, and in many cases conventional insulation dispensers can be adapted to perform as described herein.

As described above, the actuation by the user fixes a start time and/or a zero volume of a time and/or volume meter. Accordingly, it is desirable for the insulation dispenser to be configured to fix a start time and/or a zero volume of a time and/or volume meter upon actuation of the actuator by a user. The manner in which the insulation dispenser fixes the start time and/or zero volume will depend on the details of the system. For example, in embodiments like that described with respect to FIG. 2, an actuation sensor can monitor the actuation state of the trigger, and pass along an appropriate electronic signal to the time and/or volume meter. When the time and/or volume meter is disposed on the insulation dispenser, this can be through a direct electronic interconnection. When the time and/or volume meter is remote to the insulation dispenser, a wireless signal can be used, or a wire interconnecting the time and/or volume meter with the insulation dispenser can be used. When the valve is electronically controlled (e.g., with the user pushing a button or switch, which passes a signal to the time and/or volume meter to open the valve), the time and/or volume meter can be in the same electronics as the valve control.

Figure 3:
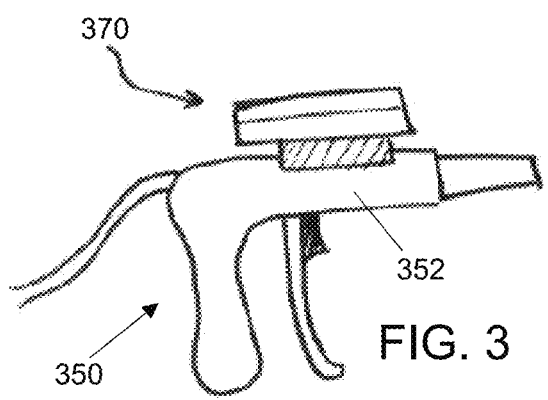
FIG. 3 is a schematic view of an insulation dispenser in the form of an insulation dispenser gun according to another embodiment of the disclosure.

A variety of configurations are available for the time and/or volume meter with respect to the insulation dispenser. For example, in certain embodiments, the time and/or volume meter is mounted on the dispenser itself. Such a configuration is shown in the schematic side view of FIG. 3, in which time and/or volume meter 370 is mounted on the body 352 of the insulation dispenser 350. In such cases, wiring or other interconnection internal to the body can pass a signal to the time and/or volume meter when the user actuates the actuator.

Figure 4:
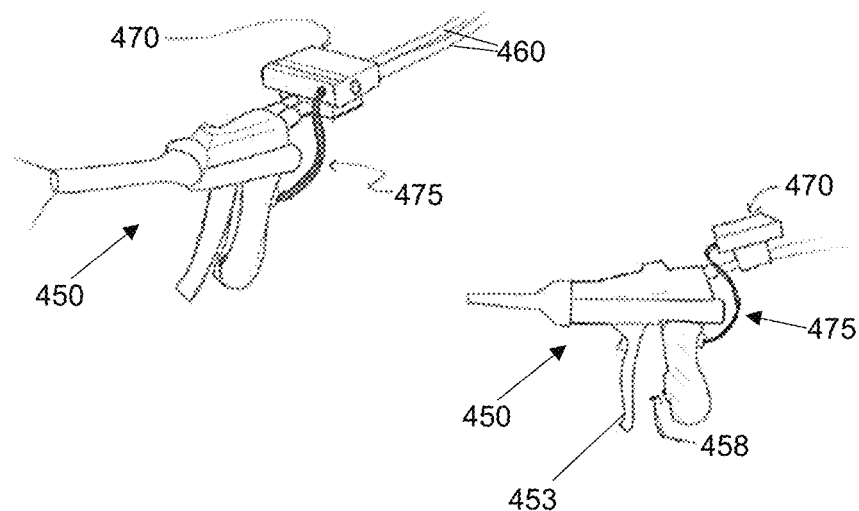
FIG. 4 is a schematic view of an insulation dispenser in the form of an insulation dispenser gun according to another embodiment of the disclosure.

In another embodiment, the time and/or volume meter mounts onto one or more hoses that are operatively connected to the one or more input ports. Such a configuration is shown in the schematic views of FIG. 4. Here, time and/or volume meter 470 is mounted on hoses 460 coupled to input ports of the body 452 of the insulation dispenser 450. An actuation sensor 458 is in the handle portion of the body, such that it can sense when trigger 453 is pulled by a user. In the embodiment of FIG. 4, a wire 475 electronically couples the actuation sensor 458 to the time and/or volume meter 470, so that an electronic signal can be passed to the time and/or volume meter when the trigger is pulled.

Figure 5:
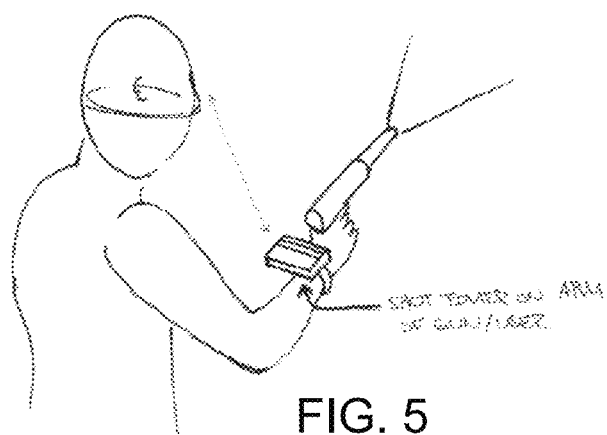
FIGS. 5 and 6 are schematic views of insulation dispensing systems according to other embodiments of the disclosure.
Figure 6:
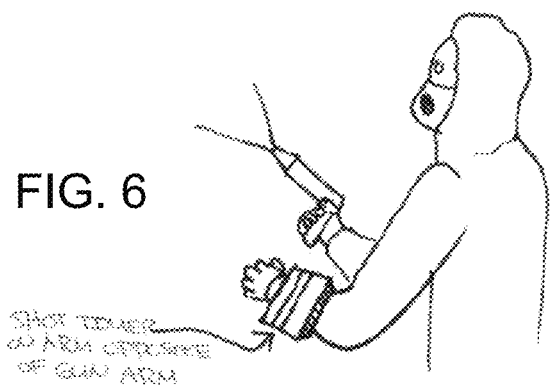

The time and/or volume meter need not be provided on or directly adjacent the insulation dispenser. For example, the time and/or volume meter can be provided as a separate device, with a wireless or wired connection to the insulation dispenser (i.e., to allow for an electronic signal to be passed to the time and/or volume meter when dispensing begins). For example, in certain embodiments, shown in schematic view in FIGS. 5 and 6, the time and/or volume meter can be provided as an arm-mountable device, such that the user can have it on an arm (e.g., on the same arm as is holding the insulation dispenser, or on the other arm). The configuration on the arm can be selected to provide ergonomic and comfortable use in a construction setting while providing feedback to the user and allowing for any desired user input to the meter.

The time and/or volume meter can take a variety of forms. The time and/or volume meter can include appropriate electronics to gather and process any necessary data, perform the desired tracking of time and/or volume, and display any desired information to a user. As the person of ordinary skill in the art will appreciate, one especially desirable form includes an alphanumeric display, e.g., formed as a liquid crystal display, an LED display, or a pixelated display. Of course, other forms are possible, e.g., a series of indicator lights that can illuminate and/or flash in a desired fashion to alert the user to status. The time and/or volume meter can also provide for user input, e.g., input of the predetermined time and/or predetermined volume to be used in the dispensing method, for example, through a keypad, a touchscreen, one or more sliders, and/or one or more knobs. In certain embodiments, an appropriately programmed mobile phone or tablet device can be used as part of the time and/or volume meter (e.g., outfitted with appropriate wired or wireless connection to the insulation dispenser and programmed with an application to provide for display and control as necessary). The screen, speaker and vibration functions of the mobile device can provide desired indications to the user.

After the user begins dispensing the foam insulation by actuating the actuator, dispensing can continue for a desired time and/or volume of material dispensed. While material is dispensed, the time and/or volume meter counts time and/or volume dispensed. During the dispensing, the time and/or volume meter can provide feedback to the user. For example, in certain embodiments, an indication of elapsed time after the start time or dispensed volume beyond the zero volume is displayed to the user during dispensing. In certain such embodiments, the indication of elapsed time or dispensed volume can be a visual indication. For example, the visual indication can include one or more of a time and/or volume count-up, a time and/or volume countdown, a status bar showing a fraction of completion with respect to the predetermined time and/or volume, a change in rate of flashing of an indicator light, and serial illumination of a series one or more indicator lights. In certain embodiments, the indication of elapsed time after the start time or dispensed volume beyond the zero volume includes a physical indication, for example, a series of vibrations or mild electrical pulses. In certain embodiments, the indication of elapsed time after the start time or dispensed volume beyond the zero volume includes an audio indication, e.g., one or more of a beeping, a tone, a buzzing or a clicking. The indication of elapsed time and/or dispensed volume can be used by the user to anticipate when to stop dispensing. However, in cases where a separate stop indication is provided as described below, indication of elapsed time and/or dispensed volume (while useful) is not required.

In certain desirable embodiments, the time and/or volume meter provides the user a stop indication (e.g., one or more of a visual stop indication, a physical stop indication and/or an audio stop indication), and in response the user actuates the valve to stop dispensing. How the user actuates the valve to stop dispensing will depend on the configuration of the insulation dispenser. For example, in cases where the insulation dispenser is configured as a "gun," the user can simply release the trigger to actuate the valve to stop dispensing.

Figure 7:
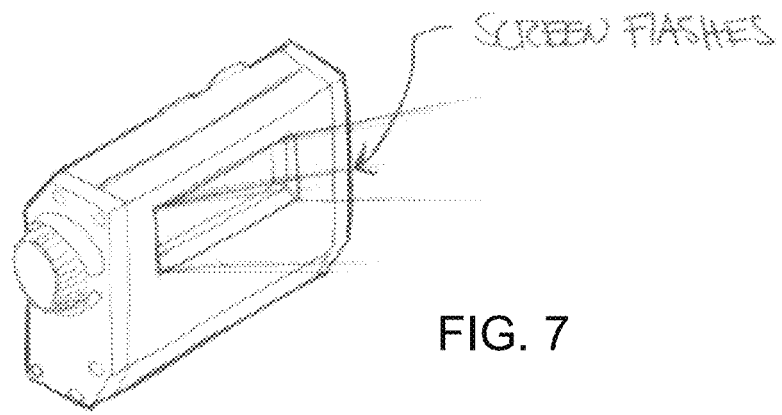
FIG. 7 is a schematic view of an indicator display according to one embodiment of the disclosure.

A wide variety of stop indications can be used, separately or in combination. In certain embodiments, the stop indication includes a visual stop indication, e.g., a flashing light (such as the flashing of a display or the flashing of the indicator light), the approach or reaching of a predetermined time and/or volume, or a display of a stop word, icon or signal on a display, or the illumination of a stop light. For example, in the embodiment shown in schematic view in FIG. 7, a screen can flash to provide the visual stop indication. In other embodiments, the user can watch the indication of elapsed time or dispensed volume (e.g., especially when it is counting down) to determine when the desired amount of material has been dispensed, and actuate the valve to stop dispensing in response thereto. For example, in the embodiment of FIG. 8, the visual display has counted up to 15; the user, knowing that the desired dispense time was 15 seconds, can actuate the valve in response to the visual display approaching or reaching that desired time. The visual display can be configured to display a variety of times, including short times (e.g., measured in seconds) and longer times (e.g., measured in minutes). In a short-time mode, for example, the timer may be able to "count" by hundredths of a second (i.e., like a stopwatch). In a longer-time mode, the display can be configured to display a maximum amount of time consistent with the display hardware (e.g., a maximum time period of 99 minutes, 99 seconds and 99 hundredths, to use all digits of a six-digit display screen). The person of ordinary skill in the art will appreciate that counting time in seconds would be most appropriate for many insulation dispensing operations, with typical shots being no more than 60 minutes in duration.

Figure 8:
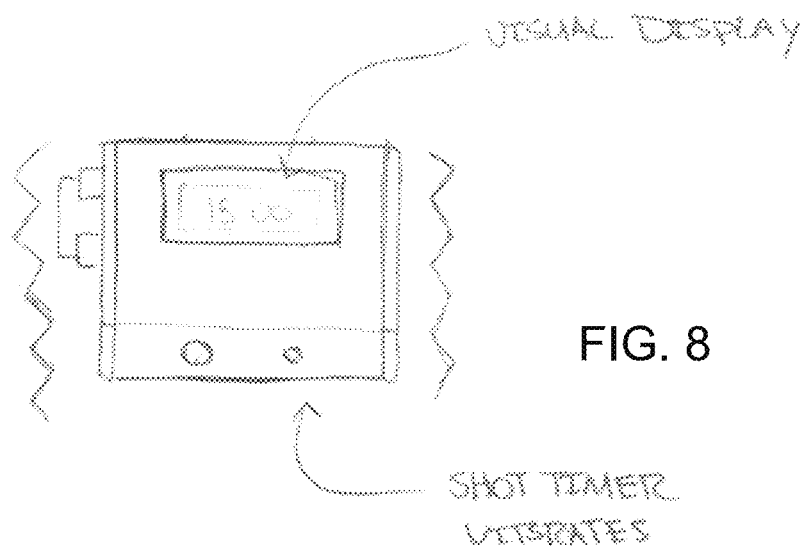
FIG. 8 is a schematic view of an indicator display according to one embodiment of the disclosure.
Figure 9:
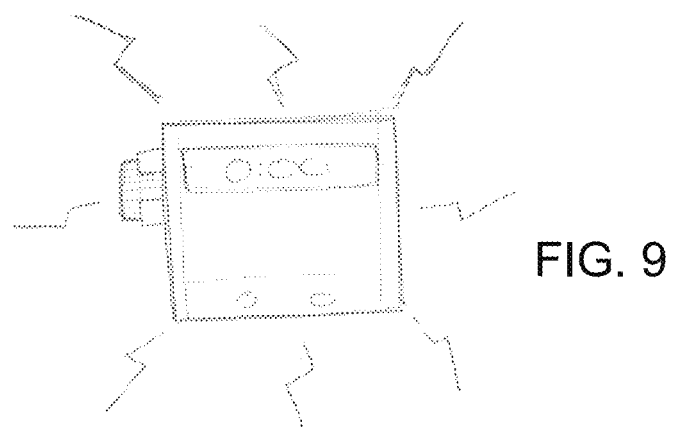
FIG. 9 is a schematic view of an indicator display according to one embodiment of the disclosure.

In certain embodiments, the stop indication includes an audible stop indication, e.g., a beeping, a tone or a change of tone, a buzzing or a clicking. The person of ordinary skill in the art can select a sound that will be heard and understood beyond the noise of a construction area. In certain embodiments, the stop indication includes a physical stop indication, such as a vibration (as indicated in FIG. 8) or a mild electrical pulse (as shown in FIG. 9, which also shows a countdown timer counted down to 0).

The indications described herein, including the visual indications (i.e., including the visual stop indication), the physical indications (i.e., including the physical stop indication) and the audio indications (i.e., including the audio stop indication) can be provided by a variety of devices configured in a variety of ways suitable to provide the desired information to the user from the time and/or volume meter. For example, in certain embodiments, one or more of the visual indications (i.e., including the visual stop indication), the physical indications (i.e., including the physical stop indication) and the audio indications (i.e., including the audio stop indication) is provided by the insulation dispenser itself. This can be, e.g., by an electronic display on the insulation dispenser itself (for example, a LCD, an LED display, a pixelated display, and/or a series of lights), which can be part of the time and/or volume meter or in communication (wired or wireless) therewith. In certain embodiments, one or more of the indications is a vibration of or an electrical pulse conducted by a part of the insulation dispenser in contact with the user (e.g., a handle being held by the user, or the trigger being held by the user). Such vibrations and/or pulses can be encoded to provide the desired information to the user (e.g., with short pulses indicating count-up or count-down of time/volume, and a long pulse as a stop indication). In certain embodiments, one or more of the indications is a sound emitted by the insulation dispenser (e.g., through a speaker or buzzer thereof).

In other embodiments, one or more of the indications is provided by an indicator device remote from the insulation dispenser. Such remote indicator devices can be, e.g., provided as part of the time and/volume meter, or separate from and in wireless communication (e.g., Bluetooth) or wired communication with the time and/or volume meter. Similar types of indications as otherwise described herein can be used. For example, in certain embodiments, one or more of the indications is provided by an electronic display (for example, a LCD, an LED display, a pixelated display, and/or a series of lights). In certain embodiments, one or more of the indications is a vibration of or an electrical pulse conducted by a part of the indicator device in contact with the user (e.g., a handle being held by the user, or the trigger being held by the user). Such vibrations and/or pulses can be encoded to provide the desired information to the user (e.g., with short pulses indicating count-up or count-down of time/volume, and a long pulse as a stop indication). In certain embodiments, one or more of the indications is a sound emitted by the indicator device (e.g., through a speaker or buzzer of the indicator device, such as an earpiece in the ear of the user).

In many embodiments it can be preferable for the user to perform the actuation of the valve to stop dispensing. This allows the user to provide ultimate control of the dispensing of the foam insulation and forces the user to remain mentally engaged with the process so as to avoid accidentally overfilling the cavity and to be on guard for any other issues. User control may also be desirable with respect to control valves of types that affect the frothing or mixing quality of the foam material. User control can also be desirable in situations where light weight and agility are important aspects of dispenser design, e.g., when for use at heights or elevations or maneuvering around confined spaces.

However, in certain embodiments, the actuation of the valve to stop dispensing is performed by a valve controller (e.g., of the insulation dispenser) in response to a signal from the time and/or volume meter. In such embodiments, the time and/or volume meter can start counting time/volume when the user actuates the valve to start dispensing, but then the actuation of the valve to stop dispensing is performed by a valve controller upon a signal from the meter when a predetermined time after the start time elapses or a predetermined volume of the foam insulation beyond the zero volume is dispensed. The person of ordinary skill in the art will appreciate that there are a variety of controllable valves, e.g., based on solenoids, suitable for controlling the flow of the foam insulation, and a variety of electronic or computer-based systems are suitable for use as valve controllers. In these embodiments, actuation by the user to start dispensing can include pulling a trigger or pressing a button to send an electronic signal to a valve controller, which opens the valve. The time and/or volume meter can send an electronic signal to the valve controller when a predetermined time after the start time elapses or a predetermined volume of the foam insulation beyond the zero volume is dispensed. The use of a valve controller to actuate the valve to stop dispensing can be used together with the indication features described above (especially the indicators of elapsed time and/or dispensed volume), or in certain embodiments can be used without such indicators.

Figure 10:
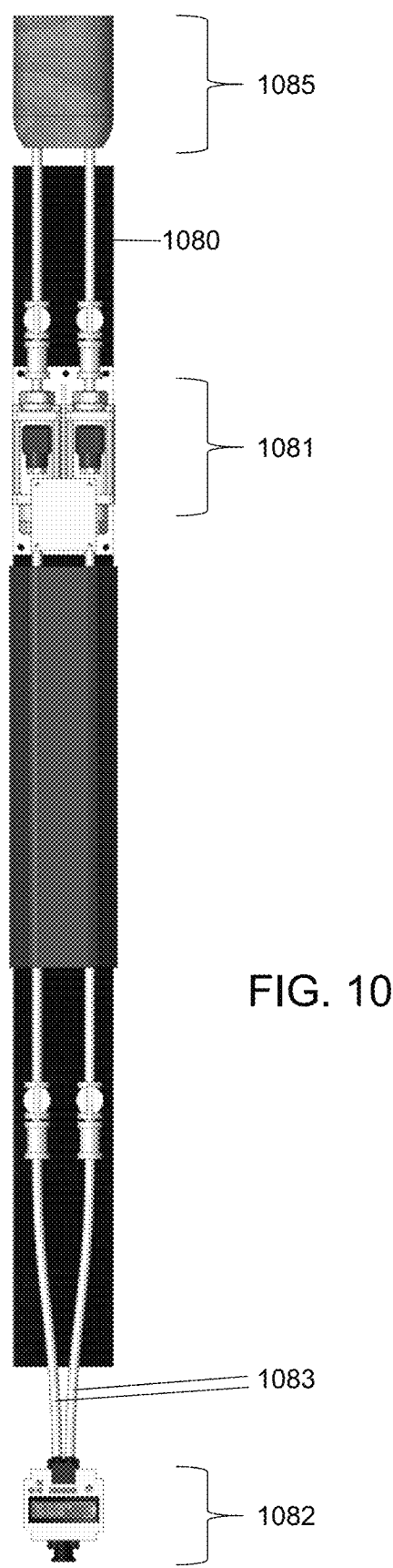
FIGS. 10 and 11 are schematic views of an insulation dispensing system according to one embodiment of the disclosure.
Figure 11:
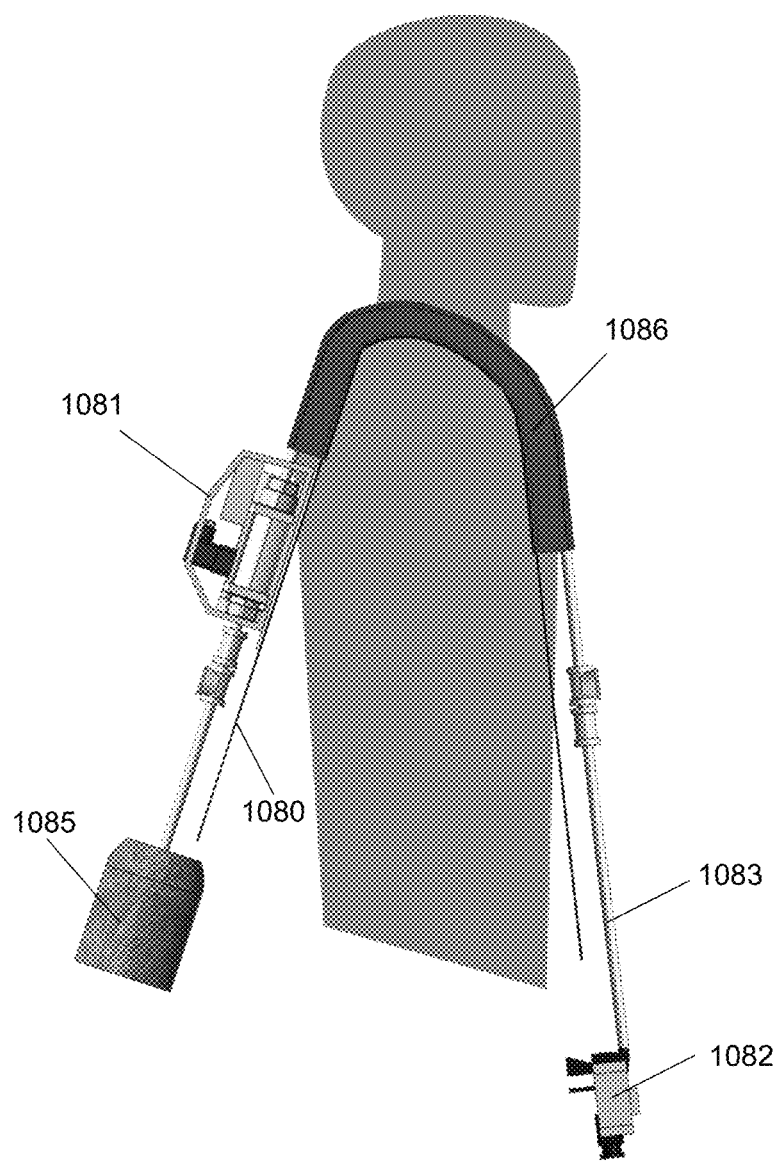

One embodiment of an insulation system including a valve controller is shown in the top and side schematic views of FIGS. 10 and 11. In this embodiment, the body includes a strap 1080, on which is disposed a valve assembly 1081 including one or more (here two) valves and a valve controller configured to open and close the valves in response to signals from the dispense head 1082. Tubes 1083 interconnect the valve assembly 1081 and the dispense head 1082. Dispense head 1082 includes a time and/or volume indicator and a mixing chamber for the precursors to be combined to form the foam, as well as a trigger for the user to pull to begin dispensing. An electronic signal from the trigger can be conducted to the valve controller (e.g., along a cable, not shown) to cause the valve controller to open the valves, thereby allowing material to flow from the heated supply tubes 1085 through the tubes 1083 of the body, into the mixing chamber of the dispense head 1082. The time and/or volume indicator of the dispense head can allow for user input, e.g., of a desired time or volume of dispense, which can then be used as the predetermined time for the processes described herein. The time and/or volume meter can be included, for example, as part of the valve assembly (e.g., in the same microprocessor as the valve controller), or as part of the time and/or volume indicator. The body can further include a shoulder rest 1086 to provide for weight distribution and ergonomic operation.

In certain embodiments of the processes described herein, it can be desirable for multiple "shots" of foam insulation to be dispensed into a single cavity. This is described, for example, in U.S. Patent Application Publication no. 2017/0080614. Accordingly, in certain embodiments as otherwise described herein, multiple cycles of actuation to begin dispensing and actuation to stop dispensing are performed, so as to dispense multiple shots of the one or more precursors into the cavity. Such multiple cycles can be performed, for example, in any manner disclosed by U.S. Patent Application Publication no. 2017/0080614. The multiple cycles can use the same predetermined volume and/or the same predetermined time, or different predetermined times and/or volumes.

As described above, the time and/or volume meter counts time and/or volume until a predetermined time elapses and/or volume is dispensed. While in some cases a time and/or volume meter can be preprogrammed with a desired predetermined time and/or volume, in certain embodiments the user will determine the predetermined time and/or volume (based, e.g., on the dimensions of the cavity to be filled, the presence or absence of any other materials in the cavity, or any other suitable considerations) and program the time and/or volume meter therewith. Accordingly, in certain embodiments, a method as otherwise described herein includes, before actuating the valve of the insulation dispenser to begin dispensing the one or more precursors of the expanded foam insulation, encoding (e.g., by the user) the time and/or volume meter with the predetermined time and/or predetermined volume. In other embodiments, the time and/or volume meter can determine the predetermined time and/or volume based at least in part on some other user input (e.g., one or more of size of cavity, volume of cavity, type of foam insulation being dispensed), optionally together with information provided by the system itself (e.g., measured temperature, measured flow rate, change of weight of one or more containers of insulation precursor).

In various embodiments as described above, the elapsed time and/or dispensed volume as calculated by the time and/or volume meter is used to determine when to stop dispensing (e.g., by the user or by the valve controller). While it can be desirable to stop dispensing precisely when the predetermined time/volume is achieved, the person of ordinary skill in the art will appreciate that, especially when a human user is actuating the valve to stop dispensing, there may be some time/volume difference between the predetermined time/volume and the actual time elapsed/volume dispensed when dispensing is stopped.

In certain embodiments as otherwise described herein, the actuation to begin dispensing fixes a start time of a time meter; and the actuation to stop dispensing is performed when a predetermined time after the start time elapses (e.g., within 20 seconds before or after elapsing, e.g., within 10 seconds or within 5 seconds). Similarly, in certain embodiments as otherwise described herein, wherein the actuation to begin dispensing fixes a start time of a time meter; the actuation to stop dispensing is performed in response to a stop indication (e.g., within 20 seconds after the stop indication, e.g., within 10 seconds or within 5 seconds). In certain such embodiments, the method can include determining a dispense rate of the insulation dispenser relating expanded foam volume to dispense time. Such a calibration can be used to determine by the person of ordinary skill in the art to determine an appropriate predetermined dispense time for a desired cavity.

In certain embodiments as otherwise described herein, the actuation to begin dispensing fixes a zero volume of a volume meter; and the actuation to stop dispensing is performed when a predetermined volume has been dispensed (e.g., within 10%, within 5%, or within 2% of the predetermined volume). Similarly, in certain embodiments, the actuation to stop dispensing is performed in response to a stop indication (e.g., within 20 seconds after the stop indication, e.g., within 10 seconds or within 5 seconds). The actuation to stop dispensing can be performed, for example, such that no more than 10% of the predetermined volume is dispensed after the stop indication, e.g., such that no more than 5%, no more than 2%, or even no more than 1% of the predetermined volume is dispensed after the stop indication. In certain such embodiments, one or more flow sensors measure the flow of the one or more precursors through the insulation dispenser, the flow sensors providing flow information to the volume meter. The flow sensors can be, for example, part of the insulation dispenser, or present in some other part of the system (e.g., at a separate valve assembly). These methods can include determining a dispense rate of the insulation dispenser relating expanded foam volume to dispense volume of one or more foam precursors or dispense volume of a foam insulation. Such a calibration can be used to determine by the person of ordinary skill in the art to determine an appropriate predetermined dispense volume for a desired cavity.

The present inventors have noted that it can be useful for the methods, devices and systems described herein to display to the user usage data with respect to the foam insulation or one or more precursors thereof. As described below, such usage data can be used in a variety of manners.

Figure 12:
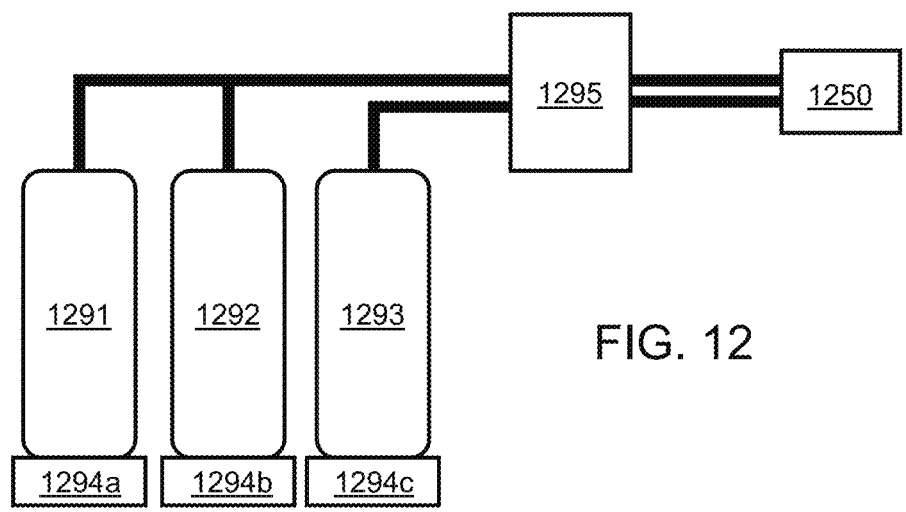
FIG. 12 is a schematic view of an insulation system according to one embodiment of the disclosure.

One issue typically encountered in insulation dispensing systems is the need to change containers of insulation precursors (e.g., the "A" and "B" components mentioned above) as they become empty. A schematic view of an insulation system is shown in FIG. 12. In this system, containers 1291, 1292 and 1293 include insulation precursors; as drawn, containers 1291 and 1292 contain a blowing agent and an "A" component of a foam insulation, and container 1293 contains a "B" component of the foam insulation. These containers are in fluid communication with a proportioning valve 1295, which ensures that the flows of the materials supplied by the containers are in the correct proportion. Proportioning valve is in fluid communication with an insulation dispenser or insulation dispensing system 1250 (e.g., as described herein). In such a system, usage data can provide the amount of material left in one or more of the containers. Such data can be calculated in a number of ways. For example, the mass of the containers can be monitored by one or more scales (1294*a-c*); knowledge of the empty container weight allows the calculation of the net amount of material remaining in the container (e.g., as a weight or as a percentage filled). Similarly, the amount of material dispensed can be estimated based on total elapsed time of dispensing or total volume dispensed since container replacement. Alternatively, a flow meter within the system can measure total amount dispensed. The usage data can be provided to the indicator device and displayed, e.g., as a set of numbers, one or more icons, or one or more lights. Provision of usage data with respect to fill levels of such containers can be helpful so that the user knows when to interrupt dispensing operations to go change out an emptying container. Such usage data can include the provision of a source change notification when a container from which one or more of the one or more precursors is supplied is nearly empty (e.g., at a preselected fill level that is no more than 20%, no more than 10%, or even no more than 5%). This can be especially helpful, as containers are usually in a trailer or other heated enclosure somewhat remote from the site of dispensing.

More generally, knowledge of the total amount of material dispensed can be useful for other purposes, for example, using system throughput for quality control, determining installer performance, understanding process efficiency and consistency, and determining whether any system components are faulty or fouled.

Figure 13:
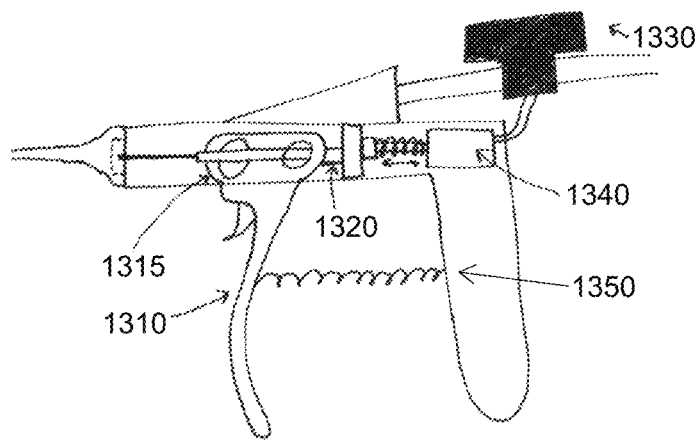
FIG. 13 is a schematic view of an insulation dispenser in the form of an insulation dispenser gun according to another embodiment of the disclosure.

Another embodiment of an insulation dispenser according to the disclosure is shown in schematic cross-sectional view in FIG. 13. Here, the insulation dispenser 1300 is in the form of a "gun," having a trigger 1310 as the user-actuatable actuator. This trigger itself does not directly control the needle valves 1320, but rather actuates a secondary actuator that actuates the needle valves to open and close them. In certain embodiments, the trigger signals the time and/or volume meter 1330 that the trigger has been pulled, and the time and/or volume meter operates the actuator (e.g., linear actuator 1340) to open the needle valves, then to close the needle valves to stop dispensing when the predetermined time and/or volume is achieved. The trigger can be returned to position by a spring 1350. Such a dispensing gun can be similar to a conventional dispensing gun, e.g., with wider internal holes 1315 for allowing the needle valves to pass through.

Figure 14:
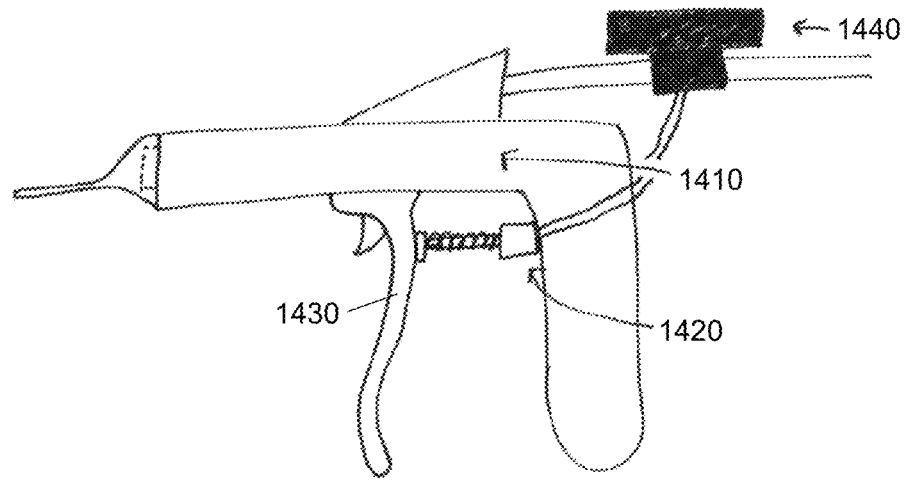
FIG. 14 is a schematic view of an insulation dispenser in the form of an insulation dispenser gun according to another embodiment of the disclosure.

Another embodiment of an insulation dispenser according to the disclosure is shown in schematic cross-sectional view in FIG. 14. Here, a conventional insulation dispensing gun body 1410 can be modified only on its outside to provide the desired functionality. The insulation dispenser further comprises an actuator 1420 mounted on the exterior of the body, the actuator being configured to pull the trigger 1430 to begin dispensing, to hold the trigger during dispensing, and to return the trigger to an unpulled state to end the dispensing. The actuator is actuatable by the user, e.g., through any of the user inputs discussed herein (as part of the input to the time/volume meter or otherwise). For example, the time and/or volume meter can be configured to cause the actuator to pull the trigger in response to a command by the user. The time and/or volume meter 1440 can be configured to cause the actuator to return the trigger to an unpulled state when the predetermined time and/or volume is achieved. Accordingly, the user can control the dispensing through the intermediary of a keypad, an app, a push-button, or some other electronic input, while the overall insulation dispenser can remain based on a conventional trigger-based insulation dispensing gun.

Another aspect of the disclosure is an insulation dispenser that uses a magnet and one or more Hall Effect sensors to communicate the actuation state of one or more valves to a time and/or volume meter. The present inventors have noted that in many cases the operation of devices having time and/or volume meters is complicated by fouling of the valves and other components by insulation material. Accordingly, the present inventors have determined that it can be desirable to provide a system in which the connection between an actuator of the one or more valves and a time and/or volume meter is not through a mechanical or wired connection. Another aspect of the disclosure is thus an insulation dispenser that includes a body having one or more input ports and an output port; one or more valves, each configured to control fluid communication between one or more of the input ports and the output port such that fluid communication being allowed when the valve(s) are open and fluid communication not being allowed when the valve(s) are closed; a time and/or volume meter, the time and/or volume meter being configured to meter a dispense time or an amount of dispensed material; at least one Hall Effect sensor operatively connected to the time and/or volume meter; and a user-actuatable actuator configured to actuate one or more magnets and to actuate the one or more valves, such that actuation of the one or more magnets causes the one or more Hall Effect sensors to communicate actuation of the valve to the time and/or volume meter, the user-actuatable actuator not otherwise being operatively coupled to the time and/or volume meter. Hall Effect sensors work by detecting a change in a magnetic field. The movement of one or more magnets by the actuator causes a change in the magnetic field at the Hall Effect sensor, which is sensed by the sensor and is used as an indication of the state of actuation of the valve. The actuation of the valve can be determined as a closed state or an open state, or in other embodiments as a continuum from fully closed to fully open. The time and/or volume sensor can be configured to use the fraction open to meter the amount of material dispensed, for example, using a calibration factor to relate fraction open to a dispense rate at a given dispense pressure. Use of a magnet in conjunction with a Hall Effect sensor can be advantageous in that it can avoid issues arising from fouling of a mechanical or electrical linkage between the actuator and the time and/or volume meter.

Figure 15:
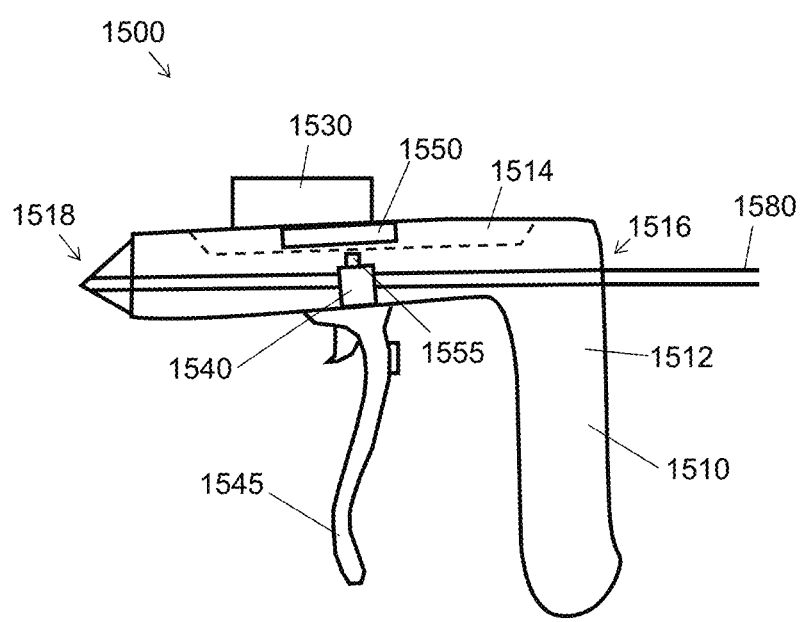
FIG. 15 is a schematic view of an insulation dispenser in the form of an insulation dispenser gun according to another embodiment of the disclosure.

One embodiment of an insulation dispenser is shown in schematic cross-sectional view in FIG. 15. The insulation dispenser 1500 includes a body 1510, having one or more input ports 1516 and an output ports 1518. While only one input port is shown, the person of ordinary skill in the art will appreciate that many devices will have two input ports, each couplable to a foam insulation precursor, with the dispenser configured to mix the two precursors so that the resulting mixture is sprayed. A supply line 1580 can be coupled to each input port. The dispenser includes one or more valves 1540, each configured to control fluid communication between one or more of the input ports and the output port such that fluid communication is allowed when the valve(s) are open and fluid communication not being allowed when the valve(s) are closed. The dispenser also includes a time and/or volume meter 1530, as described elsewhere herein. A user-actuatable actuator (here, trigger 1545) is configured to actuate the one or more valves.

Notably, the dispenser includes one or more magnets 1555, and a Hall Effect sensor 1550. Notably, the actuator is also configured to move the one or more magnets, such that actuation of the one or more magnets causes the one or more Hall Effect sensors to communicate actuation of the valve to the time and/or volume meter. The connection between the Hall Effect sensor and the time and/or volume meter can be through an electronic connection, e.g., using wiring or having the sensor integrated with the meter. Alternately, the Hall Effect sensor can communicate with the time and/or volume meter through a wireless connection, e.g. a Bluetooth connection. The user-actuatable actuator is not otherwise operatively coupled to the time and/or volume meter.

In certain embodiments, the Hall Effect sensor and the time and/or volume meter are removably coupled to the body. For example, in certain embodiments, the Hall Effect sensor and the time and/or volume meter are provided in a separate part that can be removably mounted on the body, e.g., through a snap-fit connection. In other embodiments, the body comprises a first part and a second part removably attached to the first part, wherein the user-actuatable actuator, the magnet, and the one or more valves are provided on the first part of the body, and the Hall Effect sensor and the time and/or volume meter are provided on the second part of the body. The present inventors have noted that, as a potentially more expensive part, the time and/or volume meter is not desirably replaced when other parts of the insulation dispenser need to be replaced due to fouling. Accordingly, the present inventors developed the present configuration, in which the time and/or volume meter can be triggered without a mechanical or electrical connection to the rest of the dispenser. Rather, the change in magnetic field that triggers the time and/or volume meter through the Hall Effect sensor. In the embodiment of FIG. 15, body 1510 has a first part 1512 and a second part 1514 removable therefrom. The two parts can be constructed from plastic and can be removably snap-fit to one another. Thus, the second part of the body can be removed from the first part of the body when the first part of the body (i.e., the insulation-handling portion of the device, bearing the input and output ports and the valves) becomes fouled, and a clean first part of the body can be attached. It may be desirable to recalibrate the time and/or volume sensor when it is switched to a different first body part.

Figure 16:
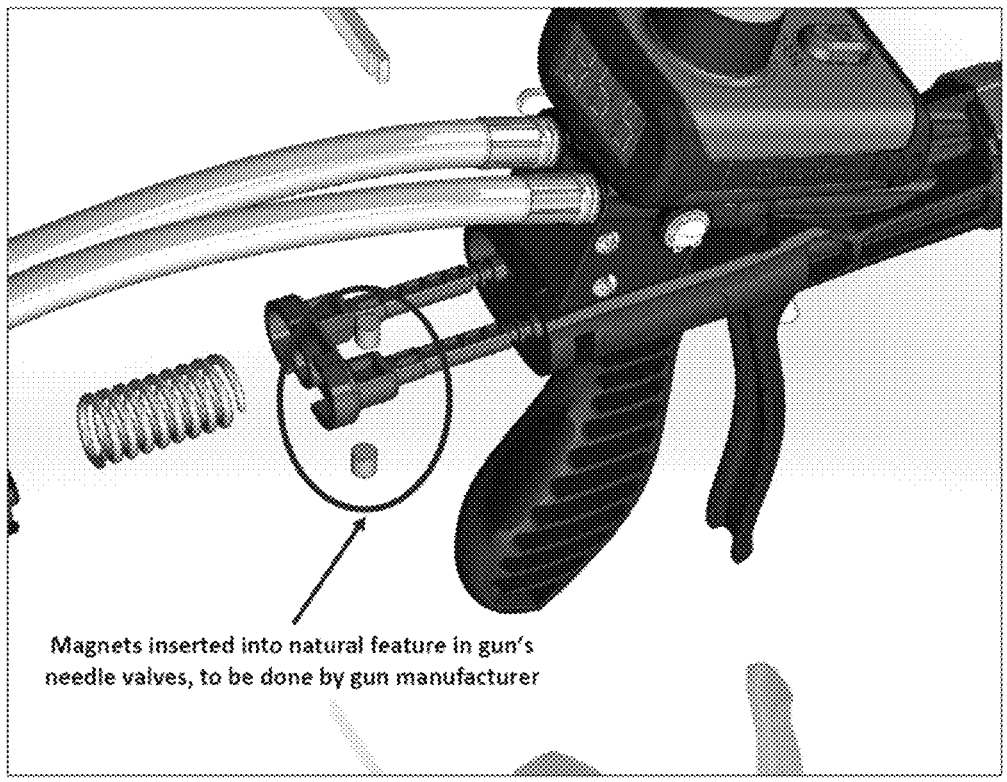
FIGS. 16 and 17 are schematic views of an insulation dispenser in the form of an insulation dispenser gun according to another embodiment of the disclosure.
Figure 17:
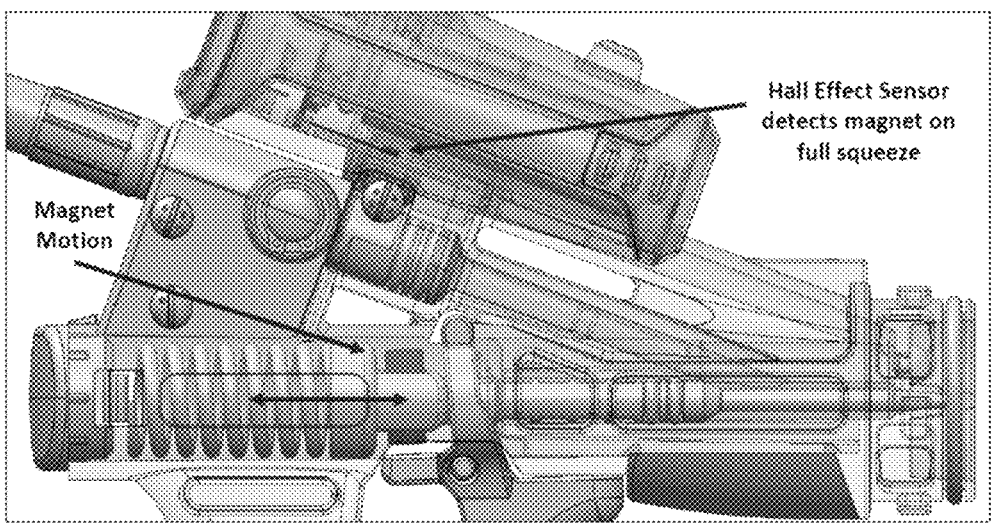

Another embodiment of the disclosure is shown in partial exploded view in FIG. 16 and in partial cross-sectional view in FIG. 17. Here, as shown in FIG. 16, one or more (here, two) magnets can be inserted in recesses in needle valves of a gun. When assembled as shown in FIG. 17, the magnet can move when the trigger is actuated to open the needle valves, and the motion can be detected by the Hall Effect sensor, which communicates the state of the actuation to the time and/or volume sensor.

The insulation dispenser according to this aspect of the disclosure can otherwise be configured as described elsewhere herein, and can be used in any of the dispensing methods described herein.

Additional embodiments of the disclosure are provided by the following numbered embodiments, which can be combined in any combination and number that is not logically or technically inconsistent.

Embodiment 1

A method for providing a cavity of a building with a predetermined amount of foam insulation, the cavity having a first wall, the method comprising
   actuating a valve (e.g., of an insulation dispenser) to begin dispensing foam insulation (e.g., from the insulation dispenser) into the cavity, the actuation being performed by a user, the actuation by the user fixing a start time and/or a zero volume of a time and/or volume meter; then,
   dispensing the foam insulation (e.g., from the insulation dispenser) into the cavity as the time and/or volume meter counts time and/or volume dispensed; then
   when a predetermined time after the start time elapses or a predetermined volume of the foam insulation beyond the zero volume is dispensed as measured by the time and/or volume meter, actuating the valve to stop dispensing the foam insulation into the cavity.

Embodiment 2

The method of embodiment 1, wherein the foam insulation is expanding foam insulation.

Embodiment 3

The method according to embodiment 2, further comprising allowing the expanding foam insulation to finish expanding after it is dispensed in the cavity, thereby forming expanded foam insulation in the cavity.

Embodiment 4

The method according to any of embodiments 1-3, wherein the cavity has a first wall having an aperture formed therein, and wherein the foam insulation is dispensed into the cavity from the insulation dispenser through the aperture.

Embodiment 5

The method according to embodiment 4, further comprising forming the aperture in the first wall before actuating the valve to begin dispensing.

Embodiment 6

The method according to embodiment 4 or embodiment 5, further comprising, after dispensing the foam insulation, patching the aperture.

Embodiment 7

The method according to any of embodiments 1-6, wherein the user pulls a trigger of the insulation dispenser (e.g., a dispensing gun) to actuate the valve to begin dispensing.

Embodiment 8

The method according to any of embodiments 1-7, wherein an indication of elapsed time after the start time or dispensed volume beyond the zero volume is provided to the user during dispensing.

Embodiment 9

The method according to embodiment 8, wherein the indication of elapsed time after the start time or dispensed volume includes a visual indication.

Embodiment 10

The method according to embodiment 9, wherein the visual indication includes one or more of a time and/or volume count-up, a time and/or volume countdown, a status bar showing a fraction of completion with respect to the predetermined time and/or volume, a change in rate of flashing of an indicator light, and serial illumination of a series one or more indicator lights.

Embodiment 11

The method according to any of embodiments 1-10, wherein the indication of elapsed time after the start time or dispensed volume includes a physical indication.

Embodiment 12

The method according to embodiment 11, wherein the physical indication includes one or more of vibration and electrical pulse.

Embodiment 13

The method according to any of embodiments 1-12, wherein the indication of elapsed time after the start time or dispensed volume includes an audio indication.

Embodiment 14

The method according to embodiment 13, wherein the audio indication includes one or more of a beeping, a buzzing and a clicking.

Embodiment 15

The method according to any of embodiments 1-14, wherein the actuation of the valve to stop dispensing is performed by the user in response to a stop indication (e.g., one or more of visual stop indication, a physical indication, and/or an audio indication) from the time and/or volume meter.

Embodiment 16

The method according to embodiment 15, wherein the user releases the trigger to actuate the valve to stop dispensing.

Embodiment 17

The method according to embodiment 15 or embodiment 17, wherein the stop indication includes a visual stop indication, e.g., a flashing light (such as the flashing of a display or the flashing of the indicator light), the approach or reaching of a predetermined time and/or volume, or a display of a stop word, icon or signal on a display, or the illumination of a stop light.

Embodiment 18

The method according to any of embodiments 15-17, wherein the stop indication includes an audible stop indication, e.g., a beeping, a buzzing or a clicking.

Embodiment 19

The method according to any of embodiments 15-18, wherein the stop indication includes a physical stop indication, e.g., a vibration or a mild electrical pulse.

Embodiment 20

The method according to any of embodiments 1-19, wherein one or more of the indications, for example, visual indications (i.e., including the visual stop indication), the physical indications (i.e., including the visual stop indication) and the audio indications (i.e., including the visual stop indication), is provided by the insulation dispenser.

Embodiment 21

The method according to embodiment 20, wherein one or more of the indications is provided an electronic display on the insulation dispenser (e.g., a LCD, an LED display, a pixelated display, and/or one or more lights).

Embodiment 22

The method according to embodiment 20 or embodiment 21, wherein one or more of the indications is a vibration of or an electrical pulse conducted by a part of the insulation dispenser in contact with the user (e.g., a handle being held by the user, or the trigger being held by the user).

Embodiment 23

The method according to any of embodiments 20-22, wherein one or more of the indications is a sound emitted by the insulation dispenser (e.g., through a speaker or buzzer thereof).

Embodiment 24

The method according to any of embodiments 1-23, wherein one or more of the indications, for example, visual indications (i.e., including the visual stop indication), the physical indications (i.e., including the visual stop indication) and the audio indications (i.e., including the visual stop indication), is provided by an indicator device remote from the insulation dispenser.

Embodiment 25

The method according to embodiment 24, wherein the indicator device is in wireless communication with the time and/or volume meter.

Embodiment 26

The method according to embodiment 24, wherein the indicator device is in wired communication with the time and/or volume meter.

Embodiment 27

The method according to embodiment 24, wherein the indicator device is part of the time and/or volume meter.

Embodiment 28

The method according to any of embodiments 24-27, wherein one or more of the indications is provided by an electronic display on the indicator device (e.g., a LCD, an LED display, a pixelated display, and/or a series of lights).

Embodiment 29

The method according to any of embodiments 24-28, wherein one or more of the physical indications is a vibration of or an electrical pulse conducted by a part of the indicator device in contact with the user.

Embodiment 30

The method according to any of embodiments 24-29, wherein one or more of the audio indications is a sound emitted by the indicator device (e.g., through a speaker or buzzer of the indicator device, such as an earpiece in the ear of the user).

Embodiment 31

The method according to any of embodiments 1-14 and 20-30, wherein the actuation of the valve to stop dispensing is performed by a valve controller (e.g., of the insulation dispenser) in response to a signal from the time and/or volume meter.

Embodiment 32

The method according to any of embodiments 1-31, wherein multiple cycles of actuation to begin dispensing and actuation to stop dispensing are performed, so as to dispense multiple shots of the one or more precursors into the cavity.

Embodiment 33

The method according to embodiment 32, wherein the multiple cycles are performed using the same predetermined time and/or the same predetermined volume.

Embodiment 34

The method according to any of embodiments 1-33, further comprising, before actuating the valve of the insulation dispenser to begin dispensing the one or more precursors of the expanded foam insulation, encoding (e.g., by the user) the time and/or volume meter with the predetermined time and/or predetermined volume.

Embodiment 35

The method according to any of embodiments 1-34, wherein the actuation to begin dispensing fixes a start time of a time meter; and the actuation to stop dispensing is performed when a predetermined time after the start time elapses (e.g., within 20 seconds before or after elapsing, e.g., within 10 seconds or within 5 seconds).

Embodiment 36

The method according to embodiment 35, wherein the actuation to begin dispensing fixes a start time of a time meter; the actuation to stop dispensing is performed in response to a stop indication (e.g., within 20 seconds after the stop indication, e.g., within 10 seconds or within 5 seconds).

Embodiment 37

The method according to embodiment 35 or embodiment 36, further comprising determining a dispense rate of the insulation dispenser relating expanded foam volume to dispense time.

Embodiment 38

The method according to any of embodiments 1-34, wherein the actuation to begin dispensing fixes a zero volume of a volume meter; and the actuation to stop dispensing is performed when a predetermined volume has been dispensed (e.g., within 10%, within 5%, or within 2% of the predetermined volume).

Embodiment 39

The method according to embodiment 38, wherein the actuation to stop dispensing is performed in response to a stop indication (e.g., within 20 seconds after the stop indication, e.g., within 10 seconds or within 5 seconds).

Embodiment 40

The method according to embodiment 38 or embodiment 39, wherein no more than 10% of the predetermined volume is dispensed after the stop indication, e.g., such that no more than 5%, no more than 2%, or even no more than 1% of the predetermined volume is dispensed after the stop indication.

Embodiment 41

The method according to any of embodiments 38-40, wherein one or more flow sensors measure the flow of the one or more precursors through the insulation dispenser, the flow sensors providing flow information to the volume meter.

Embodiment 42

The method according to any of embodiments 38-41, further comprising determining a dispense rate of the insulation dispenser relating expanded foam volume to dispense volume of the one or more precursors or dispense volume of a foam insulation.

Embodiment 43

The method according to any of embodiments 1-42, further comprising displaying to the user usage data with respect to the foam insulation or one or more precursors thereof.

Embodiment 44

The method according to embodiment 43, wherein the usage data provides the amount of material left in one or more containers from which the one or more of the precursors is supplied to the insulation dispenser.

Embodiment 45

The method according to embodiment 43 or embodiment 44, wherein the usage data provides the amount of the one or more precursors dispensed and/or the corresponding amount of expanded foam insulation since a preselected zero time.

Embodiment 46

The method according any of embodiments 43-45, wherein the usage data is configured to provide a source change notification when a container from which one or more of the one or more precursors is supplied is nearly empty (e.g., at a preselected fill level that is no more than 20%, no more than 10%, or even no more than 5%).

Embodiment 47

The method according to any of embodiments 43-46, wherein the usage data is determined at least in part based on a measured dispense time.

Embodiment 48

The method according to any of embodiments 43-47, wherein the usage data is determined at least in part based on a weight measurement of a container from which one or more of the one or more precursors is supplied.

Embodiment 49

The method according to any of embodiments 43-48, wherein the usage data is determined at least in part based on flow measurements from one or more flow meters configured to measure the flow of the one or more precursors.

Embodiment 50

The method according to any of embodiments 1-49, wherein the user inputs the predetermined time and/or predetermined volume to the time and/or volume meter.

Embodiment 51

The method according to any of embodiments 1-49, wherein the time and/or volume meter determines the predetermined time and/or volume based at least in part on user input (e.g., one or more of size of cavity, volume of cavity, type of foam insulation being dispensed), optionally together with information provided by the system itself (e.g., measured temperature, measured flow rate, change of weight of one or more containers of insulation precursor).

Embodiment 52

An insulation dispenser comprising:
a body having one or more input ports and an output port;
one or more valves, each configured to control fluid communication between one or more of the input ports and the output port such that fluid communication is allowed when the valve(s) are open and fluid communication not being allowed when the valve(s) are closed;
a time and/or volume meter, the time and/or volume meter being configured to meter a dispense time or an amount of dispensed material;
one or more Hall Effect sensors operatively connected to the time and/or volume meter; and
a user-actuatable actuator configured to move one or more magnets and to actuate the one or more valves, such that actuation of the one or more magnets causes the one or more Hall Effect sensors to communicate actuation of the valve to the time and/or volume meter, the user-actuatable actuator not otherwise being operatively coupled to the time and/or volume meter.

Embodiment 53

The insulation dispenser according to embodiment 52, wherein the Hall Effect sensor and the time and/or volume meter are removably coupled to the body.

Embodiment 54

An insulation dispenser comprising:
a body having one or more input ports and an output port
one or more valves, each configured to control fluid communication between one or more of the input ports and the output port such that fluid communication being allowed when the valve(s) are open and fluid communication not being allowed when the valve(s) are closed;
a user-actuatable actuator configured to actuate the one or more valves;
wherein the insulation dispenser is configured to fixing a start time and/or a zero volume of a time and/or volume meter upon actuation of the actuator by a user.

Embodiment 55

The insulation dispenser according to any of embodiments 52-54, having a nozzle operatively connected to the output port.

Embodiment 56

The insulation dispenser according to any of embodiments 52-54, having an output tube operatively connected to the output port.

Embodiment 57

The insulation dispenser according to any of embodiments 54-56, further comprising a time and/or volume meter mounted on the body.

Embodiment 58

The insulation dispenser according to any of embodiments 52-57, further comprising an indicator device configured to provide to a user an indication of elapsed time after the start time or dispensed volume beyond the zero volume.

Embodiment 59

The insulation dispenser according to embodiment 58, wherein the indicator device is configured to provide to the user a stop indication when a predetermined time after the start time elapses or a predetermined volume of the foam insulation beyond the zero volume is dispensed.

Embodiment 60

The insulation dispenser according to any of embodiments 52-57, further comprising an indicator device configured to provide to the user a stop indication when a predetermined time after the start time elapses or a predetermined volume of the foam insulation beyond the zero volume is dispensed.

Embodiment 61

The insulation dispenser according to any of embodiments 58-60, wherein the indicator device includes an electronic display on the insulation dispenser (e.g., a LCD, an LED display, a pixelated display, and/or one or more lights).

Embodiment 62

The insulation dispenser according to any of embodiments 58-61 wherein the indicator device is configured to provide vibration or an electrical pulse.

Embodiment 63

The insulation dispenser according to any of embodiments 58-62, wherein the indicator device is configured to provide a sound.

Embodiment 64

The insulation dispenser according to any of embodiments 58-63, wherein the indicator device is part of the time and/or volume meter.

Embodiment 65

The insulation dispenser according to any of embodiments 52-58 or 59-64, wherein the time and/or volume meter is configured to provide a signal to a valve controller when a predetermined time after the start time elapses or a predetermined volume of the foam insulation beyond the zero volume is dispensed, and the valve controller is configured to actuate the valve to stop dispensing in response to the signal from the time and/or volume meter.

Embodiment 66

The insulation dispenser according to any of embodiments 52-65, wherein the user-actuatable actuator is a trigger, operatively coupled to actuate a secondary actuator that actuates the valve.

Embodiment 67

The insulation dispenser according to any of embodiments 52-66, wherein the insulation dispenser includes a trigger that is not the user-actuatable actuator, wherein the insulation dispenser further includes an actuator configured to pull the trigger to begin dispensing. to hold the trigger during dispensing, and to return the trigger to an unpulled state to end the dispensing, the actuator being actuatable by the user.

Embodiment 68

The insulation dispenser according to embodiment 67, wherein the time and/or volume meter is configured to cause the actuator to pull the trigger in response to a command by the user.

Embodiment 69

The insulation dispenser according to embodiment 68, wherein the time and/or volume meter is configured to cause the actuator to return the trigger to an unpulled state when the predetermined time and/or volume is achieved.

Embodiment 70

An insulation dispensing system comprising the insulation dispenser according to any of embodiments 52-69.

Embodiment 71

The insulation dispensing system according to embodiment 70, further comprising one or more hoses operatively connected to the one or more input ports, the one or more hoses being configured to convey one or more precursors of the foam insulation.

Embodiment 72

The insulation dispensing system according to embodiment 71, wherein the time and/or volume meter is mounted on one or more of the one or more hoses.

Embodiment 73

The insulation dispensing system according to embodiment 70, wherein the time and/or volume sensor is a separate device from the insulation dispenser, e.g., with a wired or wireless connection to the insulation dispenser (i.e., configured to allow for an electronic signal to be passed to the time and/or volume meter when dispensing begins).

Embodiment 74

The insulation dispensing system according to embodiment 73, wherein the time and/or volume meter is arm-mountable (for example, mounted on an arm of the user).

Embodiment 75

The insulation dispensing system according to any of embodiments 70-74, further comprising an indicator device configured to provide to a user an indication of elapsed time after the start time or dispensed volume beyond the zero volume.

Embodiment 76

The insulation dispensing system according to embodiment 75, wherein the indicator device is configured to provide to the user a stop indication when a predetermined time after the start time elapses or a predetermined volume of the foam insulation beyond the zero volume is dispensed.

Embodiment 77

The insulation dispensing system according to embodiment 75 or embodiment 76, further comprising an indicator device configured to provide to the user a stop indication when a predetermined time after the start time elapses or a predetermined volume of the foam insulation beyond the zero volume is dispensed.

Embodiment 78

The insulation dispensing system according to any of embodiments 75-77, wherein the indicator device includes an electronic display on the insulation dispenser (e.g., a LCD, an LED display, a pixelated display, and/or one or more lights).

Embodiment 79

The insulation dispensing system according to any of embodiments 75-78, wherein the indicator device is configured to provide vibration or an electrical pulse.

Embodiment 80

The insulation dispensing system according to any of embodiments 75-79, wherein the indicator device is configured to provide a sound.

Embodiment 81

The insulation dispensing system according to any of embodiments 75-80, wherein the indicator device is part of the time and/or volume meter.

Embodiment 82

The insulation dispensing system according to any of embodiments 75-81, wherein the indicator device is separate from the time and/or volume meter, and wirelessly or wiredly connected thereto.

Embodiment 83

The insulation dispensing system according to any of embodiments 75-82, wherein the time and/or volume meter is configured to provide a signal to a valve controller when a predetermined time after the start time elapses or a predetermined volume of the foam insulation beyond the zero volume is dispensed, and the valve controller is configured to actuate the valve to stop dispensing in response to the signal from the time and/or volume meter.

Embodiment 84

The method according to any of embodiments 1-51, using an insulation dispenser according to any of embodiments 51-69.

Embodiment 85

The method according to any of embodiments 1-51, using a system according to any of embodiments 70-82.

Embodiment 86

An insulation dispenser according to any of embodiments 52-69, configured to perform a method of any of embodiments 1-50.

Embodiment 87

A system according to any of embodiments 70-83, configured to perform a method of any of embodiments 1-50.

It will be apparent to those skilled in the art that various modifications and variations can be made to the processes and apparatuses described here without departing from the scope of the disclosure. Thus, it is intended that the present disclosure cover such modifications and variations of this invention provided they come within the scope of the appended claims and their equivalents.

What is claimed is:

1. A method for providing a cavity of a building with a predetermined amount of foam insulation, the cavity being bounded by a first wall, the method comprising
actuating a valve of an insulation dispenser to begin dispensing foam insulation into the cavity, the actuation being performed by a user, the actuation by the user fixing a start time and/or a zero volume of a time and/or volume meter; then,
dispensing the foam insulation into the cavity as the time and/or volume meter counts time and/or volume dispensed, wherein an indication of elapsed time after the start time or dispensed volume beyond the zero volume is provided to the user during dispensing by the time and/or volume meter; then
when a predetermined time after the start time elapses or a predetermined volume of the foam insulation beyond the zero volume is dispensed as measured by the time and/or volume meter, actuating the valve to stop dispensing the foam insulation into the cavity, wherein the actuation of the valve to stop dispensing is performed by the user in response to a stop indication from the time and/or volume meter,
wherein one or more insulation precursors are provided from one or more containers to provide the foam insulation, and wherein the method further comprises
displaying to the user usage data with respect to the one or more insulation precursors,
wherein the usage data provides the amount of material left in the one or more containers.

2. The method according to claim 1, wherein the user pulls a trigger of the insulation dispenser to actuate the valve to begin dispensing.

3. The method according to claim 1, wherein the indication of elapsed time after the start time or dispensed volume beyond the zero volume includes a visual indication.

4. The method according to claim 3, wherein the visual indication includes one or more of a time and/or volume count-up, a time and/or volume countdown, a status bar showing a fraction of completion with respect to the predetermined time and/or volume, a change in rate of flashing of an indicator light, and serial illumination of a series one or more indicator lights.

5. The method according to claim 1, wherein the indication of elapsed time after the start time or dispensed volume includes a physical indication.

6. The method according to claim 1, wherein the stop indication is provided by the insulation dispenser.

7. The method according to claim 6, wherein the stop indication is provided by a display on the insulation dispenser.

8. The method according to claim 1, wherein the stop indication is provided by an indicator device remote from the insulation dispenser.

9. The method according to claim 1, wherein multiple cycles of actuation to begin dispensing and actuation to stop dispensing are performed, so as to dispense multiple shots of the foam insulation into the cavity.

10. The method according to claim 1, further comprising, before actuating the valve of the insulation dispenser to begin dispensing the foam insulation, encoding the time and/or volume meter with the predetermined time and/or predetermined volume.

11. The method according to claim 1, wherein the actuation to begin dispensing fixes a start time of a time meter; and the actuation to stop dispensing is performed when a predetermined time after the start time elapses.

12. The method according to claim 11 further comprising determining a dispense rate of the insulation dispenser relating expanded foam volume to dispense time.

13. The method according to claim 1, wherein the actuation to begin dispensing fixes a zero volume of a volume meter; and the actuation to stop dispensing is performed when a predetermined volume has been dispensed.

14. The method according to claim 13, wherein one or more flow sensors measure the flow of the one or more precursors through the system including insulation dispenser, the flow sensors providing flow information to the volume meter.

15. The method according to claim 1, wherein the stop indication is visual stop indication from time and/or volume meter.

16. The method according to claim 2, wherein the user releases the trigger to actuate the valve to stop dispensing.

17. The method according to claim 1, wherein the time and/or volume meter determines the predetermined time and/or volume based at least in part on user input, the user input comprising one or more of size of cavity, volume of cavity, and type of foam insulation being dispensed; and (b) information comprising one or more of measured temperature, measured flow rate, and change of weight of the one or more containers of insulation precursor.

18. The method of claim 1, wherein usage data are determined by monitoring the weight of the one or more containers.

19. The method of claim 1, wherein usage data are determined by determining the total amount or volume of the one or more insulation precursors dispensed since an immediately previous replacement of the one or more containers.

20. The method of claim 1, wherein usage data includes a source change notification when a container from which one or more of the one or more precursors is has a preselected fill level, the preselected fill level being no more than 10% of a 100% fill level of the container.

* * * * *